Sept. 1, 1970  E. G. OBEDA  3,526,554
METHOD FOR PRODUCING A FILLET TYPE WELD ON THERMOPLASTIC
MATERIAL USING ULTRASONIC ENERGY
Filed Oct. 31, 1968  2 Sheets-Sheet 1

INVENTOR.
EDWARD G. OBEDA

Sept. 1, 1970  E. G. OBEDA  3,526,554
METHOD FOR PRODUCING A FILLET TYPE WELD ON THERMOPLASTIC
MATERIAL USING ULTRASONIC ENERGY
Filed Oct. 31, 1968  2 Sheets-Sheet 2
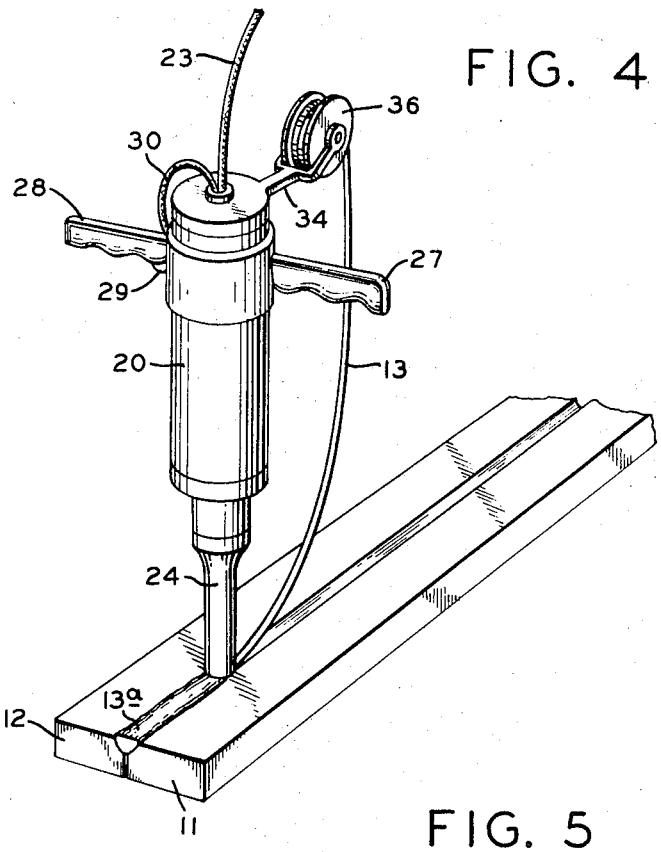
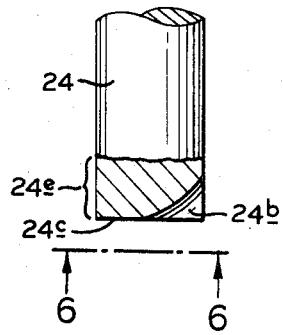
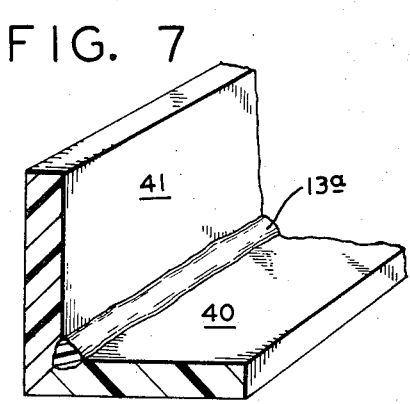
INVENTOR.
EDWARD G. OBEDA
BY
Erwin B. Steinberg

United States Patent Office 3,526,554
Patented Sept. 1, 1970

3,526,554
METHOD FOR PRODUCING A FILLET TYPE WELD ON THERMOPLASTIC MATERIAL USING ULTRASONIC ENERGY
Edward G. Obeda, Brookfield, Conn., assignor to Branson Instruments, Incorporated, Stamford, Conn., a corporation of Delaware
Filed Oct. 31, 1968, Ser. No. 772,184
Int. Cl. B29c 27/08
U.S. Cl. 156—73         2 Claims

ABSTRACT OF THE DISCLOSURE

A fillet type weld on thermoplastic parts is made by disposing strip or ribbon thermoplastic filler material in the space to be filled, and applying ultrasonic energy in order to soften and fuse the filler material with the base parts.

---

This invention refers to a method and apparatus for producing a fillet type weld on thermoplastic parts and, more specifically, has reference to a method and apparatus using ultrasonic energy for producing such weld.

A fillet type weld is one in which material is added to fill the space provided by generally concave surfaces. Typically, a fillet type weld is used to fill the gap between two beveled surfaces or to fill the space between two surfaces meeting each other at an angle. Sometimes, such fillet type weld is provided for bonding purposes, welding both parts to each other, while at other times such a weld is provided merely in order to prodlce a more finished and pleasing appearance of the workpiece. The present invention discloses a most convenient and fast method for producing a fillet type weld between two plastic surfaces wherein the action of ultrasonic energy is used for obtaining fusion between the material added and the base material.

One of the principal objects of this invention is, therefore, the provision of a new and improved process and apparatus for producing a fillet type weld on thermoplastic parts.

Another important object of this invention is the provision of a method and apparatus for producing a fillet type weld using ultrasonic energy.

A further and other object of this invention is the provision of a method and apparatus for obtaining a fillet type weld on thermoplastic parts using thermoplastic ribbon material which is fed to the workpiece and subjected to ultrasonic energy in order to be softened and fused to the workpiece.

Flrther and still other objects of this invention will be more clearly apparent by reference to the following description when taken in conjunction with the accompanying drawings, in which:

FIG. 4 is a perspective view of the apparatus, the workpiece and the ribbon feed mechanism;

FIG. 5 is a partial view, partially sectioned, of the frontal surface of the horn;

FIG. 6 is a plan view along line 6—6 in FIG. 5, and

FIG. 7 is a perspective view of an alternative workpiece with a fillet type weld in place.

Figure 1:
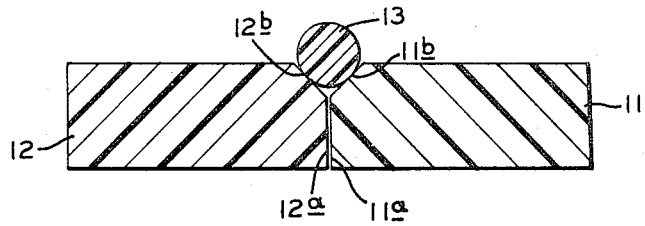
FIG. 1 is a sectional view of two parts forming a workpiece on which a fillet type weld is to be accomplished.

Referring now to the figures and FIG. 1 in particular, numerals 11 and 12 refer to two thermoplastic parts made for instance of polystyrene material. Both parts are in abutting relation along respective vertical surfaces 11a and 12a which, in turn, are bevelled at their upper ends as seen by the surfaces 11b and 12b. The cavity formed by the bevelled surfaces 11b and 12b is to be filled by a fillet type weld using thermoplastic material 13, which conveniently may be in ribbon form.

Figure 2:
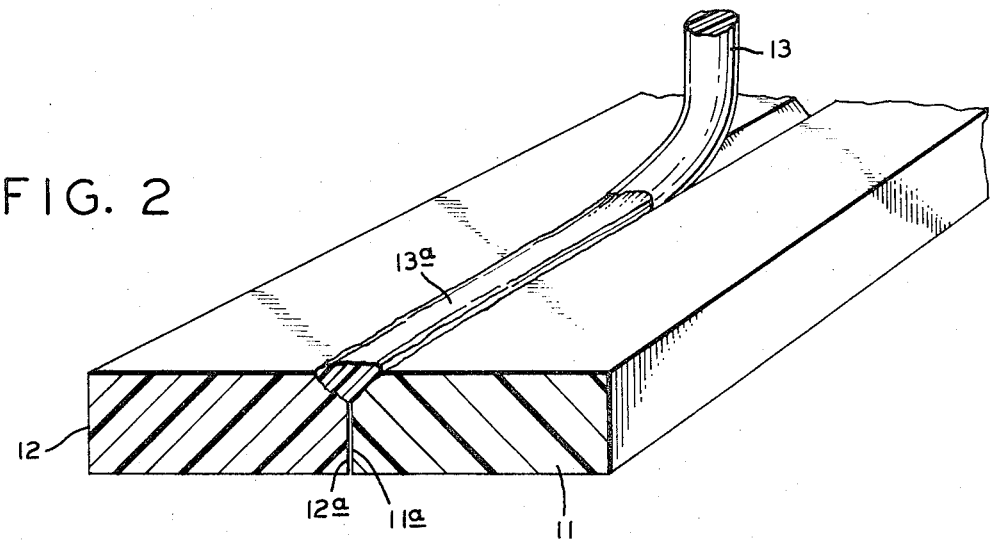
FIG. 2 is a perspective view of the partially completed workpiece.

As clearly shown in FIG. 2, a portion of the ribbon material 13 has been welded or fused into the cavity formed by the surfaces 11b and 12b, see the flsed portion identified by numeral 13a.

Figure 3:
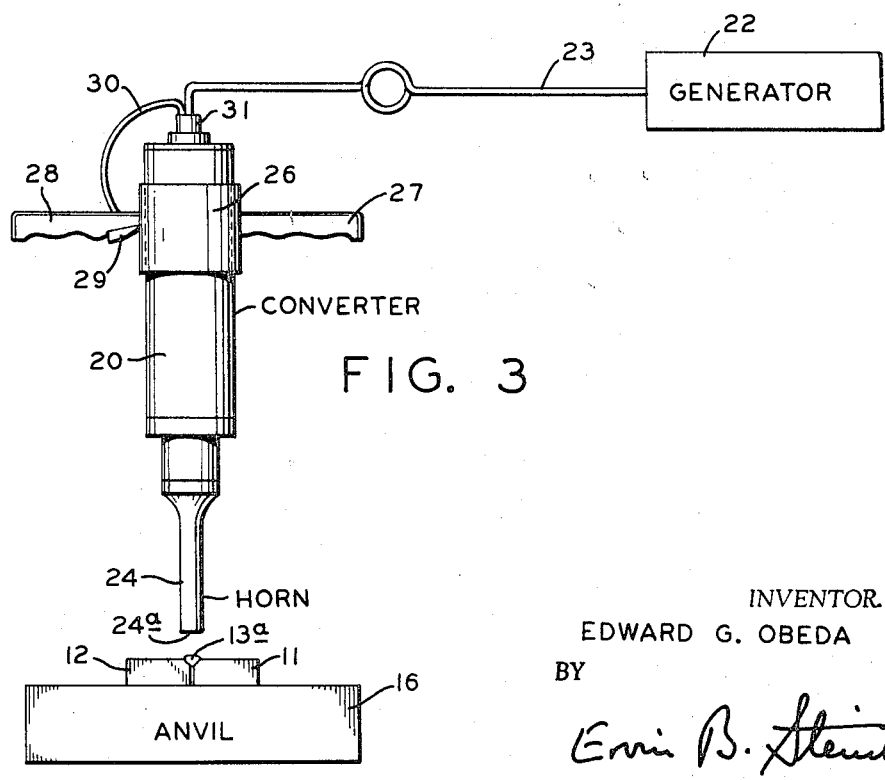
FIG. 3 is a schematic illustration of the apparatus and workpiece.

FIG. 3 illustrates the apparatus and arrangement for conveniently providing such a fillet type weld. Numeral 20 identifies an ultrasonic energy converter as shown for instance in U.S. Pat. No. 3,328,619 entitled "Sonic Wave Generator," S. E. Jacke et al., dated June 27, 1967. A converter of this type receives high frequency electrical energy from a generator 22 via a cable 23 The received electrical energy is converted within the converter unit 20 to acoustic energy by means of one or more piezoelectric transducer disks which, responsive to the electrical energy applied, provide vibrational energy. Instead of piezoelectric means, magnetostrictive means may be used as is well understood by those skilled in the art. In order to amplify the vibrations produced by the transducer or transducers, a mechanical amplitude transformer 24, also known as horn, is coupled to the transducer and provides vibrational energy in axial direction at its front end, the amplitude of vibration being in the order of 0.001 to 0.003 inch. The underside 24a of the horn is adapted to be brought into contact with the thermoplastic ribbon 13 and, responsive to the horn surface 24a being urged into engagement with the ribbon 13 and the dissipation of sonic energy, the thermoplastic material softens and fuses with the underlying base material. The fusing of the ribbon portion occurs at the area of contact by the horn and, depending upon the rigidity of the thermoplastic ribbon and its acoustic properties, may spread also beyond the area contacted by the horn's frontal surface. The workpiece 11 and 12 may suitably be disposed on an anvil or base 16.

The converter 20 and generator 22, typically, are commercial units, for instance Model J17, available from Branson Sonic Power Company, Danbury, Conn. In order to provide a manually controllable unit, the housing of the converter 20 has been provided with an annular ring 26 which is fitted with a set of extending handles 27 and 28, and a trigger switch 29 for controlling the application of electrical energy. The trigger switch 29 via conductor 30 and electrical conductor 31 is connected through cable 23 to the generator 22 for controlling the flow of electrical energy to the converter 20.

The frequency of ultrasonic energy provided by the generator 22 and the converter 20 typically is in the order of 20 kHz. but frequencies above or below this value may be used without affecting the overall method of operation.

In FIG. 4, the converter 20 has been fitted with a bracket 34 for carrying a roll 36 of thermoplastic ribbon material 13. As the converter 20 is guided along the workpieces 11 and 12 the roll 36 slowly unwinds the necessary amount of ribbon material. In a typical example, the thermoplastic ribbon material unwound varied from 1/32" diameter to 1/4" diameter. As shown in FIG. 4, the handles 27, 28 are disposed along an axis which is at 90 degrees with respect to the direction of the fillet weld. Depending on operator preference, the handles may be rotated so that, for instance, they are aligned with the direction of the weld.

FIGS. 5 and 6 show a preferred embodiment of the frontal end 24e of the horn 24. The frontal end of the horn is provided with a rounded groove 24b which extends into a portion of the underside 24a and extends also slightly upward toward the rear. As the horn is drawn along the workpiece, the ribbon 13 is fed into the groove 24b and then, responsive to guiding the converter along the workpiece, the ribbon material reaches the flat underside portion 24C of the horn, which surface acts as a pressure or tamping surface. While urging the frontal surface of the horn into intimate contact with the ribbon and workpiece, responsive to the dissipation of sonic energy the ribbon material softens, melts and fuses with the base material. This process is aided if the thermoplastic parts 11 and 12 or the depth of the groove are dimensioned in such a way that the underside of the horn, after softening the ribbon material 13, also engages the surfaces of the base material.

Responsive to the cessation of sonic energy transfer, which can be effected either by releasing the trigger switch 29 or moving the horn away from the softened portions, the softened and partially liquid thermoplastic material hardens and a fusion joint is obtained.

FIG. 7 shows a slightly different arrangement wherein two workpieces 40 and 41 meet each other at an angle of about 90° and a fillet weld is made using the same process as described heretofore.

In an alternative arrangement the material to be added may comprise precut strips which are disposed in the space to be filled and the ultrasonic energy device then is drawn over such pieces, causing ultrasonic energy to be coupled to the thermoplastic material for effecting softening and fusing. Still further, the frontal end 24e of the horn, instead of circular cross section, may be of square or rectangular cross section.

It will be apparent that the fillet type weld described above may be produced for fusing or welding two thermoplastic parts to each other, for filling a gap occurring between two surfaces, or merely for providing a more desirable and finished appearance of the completed product.

What is claimed is:

1. The method of producing a fillet type weld on thermoplastic parts using ultrasonic energy comprising:

disposing a strip of thermoplastic material in the space to be filled;

contacting the strip material portion to be fused into the space with an ultrasonically vibrating tool and, responsive to such contact, urging such strip portion into intimate contact with abutting thermoplastic surfaces whereby, responsive to frictional contact and the dissipation of sonic energy, said strip material at the area of such contact is caused to soften and flow, and interrupting the flow of said energy to cause hardening of the softened material and providing a fusion joint.

2. The method of producing a fillet type weld for filling the space between two thermoplastic surfaces using ultrasonic energy comprising:

disposing a portion of thermoplastic ribbon material in the space to be filled;

contacting the ribbon portion with an ultrasonically vibrating tool and responsive to such contact urging said ribbon portion into intimate contact with the abutting thermoplastic surfaces whereby, responsive to frictional contact and the dissipation of sonic energy, said ribbon portion at the area of abutting contact is caused to soften and flow, and interrupting the flow of said ultrasonic energy to cause hardening and reforming of the softened ribbon material for achieving a fusion joint between the ribbon portion and the abutting surfaces.

References Cited

UNITED STATES PATENTS 3,367,809   2/1968   Soloff _____ 156—73

CARL D. QUARFORTH, Primary Examiner

A. J. STEINER, Assistant Examiner

U.S. Cl. X.R.

29—470.3